Figure 1:
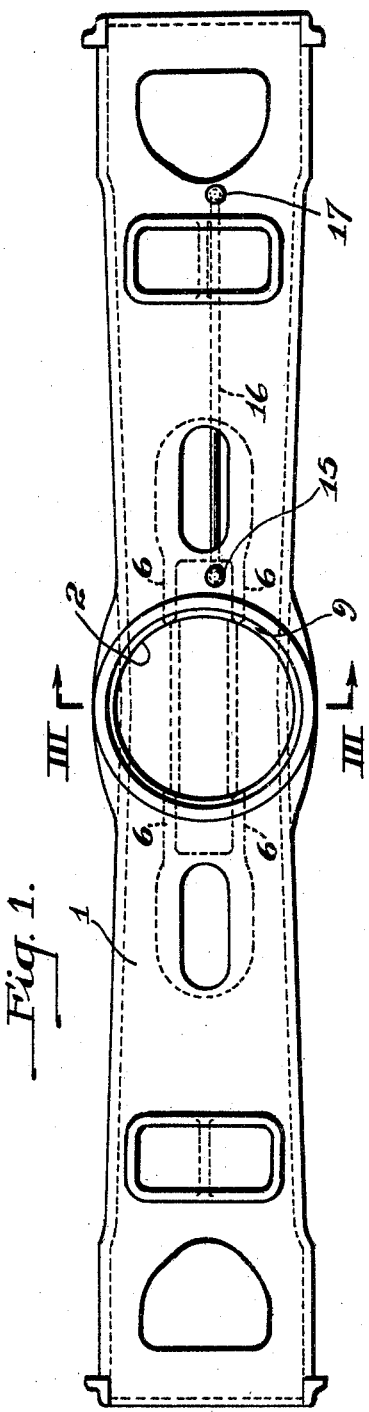

June 6, 1933. J. ALLISON 1,912,563
CAR TRUCK CENTER BEARING
Filed Sept. 7, 1928 2 Sheets-Sheet 1

WITNESS
A. B. Wallace.

INVENTOR
John Allison
By Brown & Critchlow
his Attorneys.

June 6, 1933.   J. ALLISON   1,912,563
CAR TRUCK CENTER BEARING
Filed Sept. 7, 1928   2 Sheets-Sheet 2

Patented June 6, 1933

1,912,563

UNITED STATES PATENT OFFICE

JOHN ALLISON, OF SWISSVALE, PENNSYLVANIA, ASSIGNOR TO PITTSBURGH STEEL FOUNDRY CORPORATION, OF GLASSPORT, PENNSYLVANIA, A CORPORATION OF PENNSYLVANIA

CAR TRUCK CENTER BEARING

Application filed September 7, 1928. Serial No. 304,395.

This invention relates to center bearings for railway car trucks, and more especially to self-lubricating center bearings made integral with the truck bolster.

Center bearings for railway cars as commonly constructed in the past have usually consisted of a male member attached to the bottom of the car body and a cooperating female member attached to the top of the truck bolster, these members being held together by means of a king bolt pin or some similar retaining device, and the pivot connection not being regularly lubricated. Where the bearing surfaces are not properly lubricated friction impedes the swiveling movement of the truck with the result that an excessive flange pressure is imposed by the car wheels upon the rails when the car is rounding a curve, which impedes the progress of the car.

Recently the art has turned toward making the female center bearing members integral with the truck bolsters instead of in the form of separate detachable members. This change has made it necessary to provide new ways for lubricating the bearing surfaces, and also made it necessary to reenforce the truck bolsters in their central portions to compensate for the reduction in their strength occasioned by the incorporation of the female bearing members therein.

An object of this invention is to provide a self-lubricating center bearing for railway cars in which the bearing members are made integral with the car and truck bolsters, and which are so constructed that the car may be turned up-side-down for dumping without the lubricating oil escaping from the bearing.

Another object of the invention is to provide a reservoir capable of carrying a liberal supply of lubricating oil in the truck bolster adjacent to and opening into the female member of the bearing, the reservoir having means for conveniently filling it with lubricating oil.

Another object of the invention is to provide a packing ring for preventing foreign matter such as cinders and dust from entering, and lubricating oil from escaping from the bearing, which ring is so arranged between the two bearing members that it will function properly independently of the wearing away of the bearing members.

A further object of the invention is to provide stiffening ribs in the truck bolster for preventing the stresses set up in the bolster from injuriously distorting the female bearing member, and so forming the ribs as to provide reservoirs in the truck bolster capable of containing an adequate supply of oil for lubricating the bearing.

Figure 2:
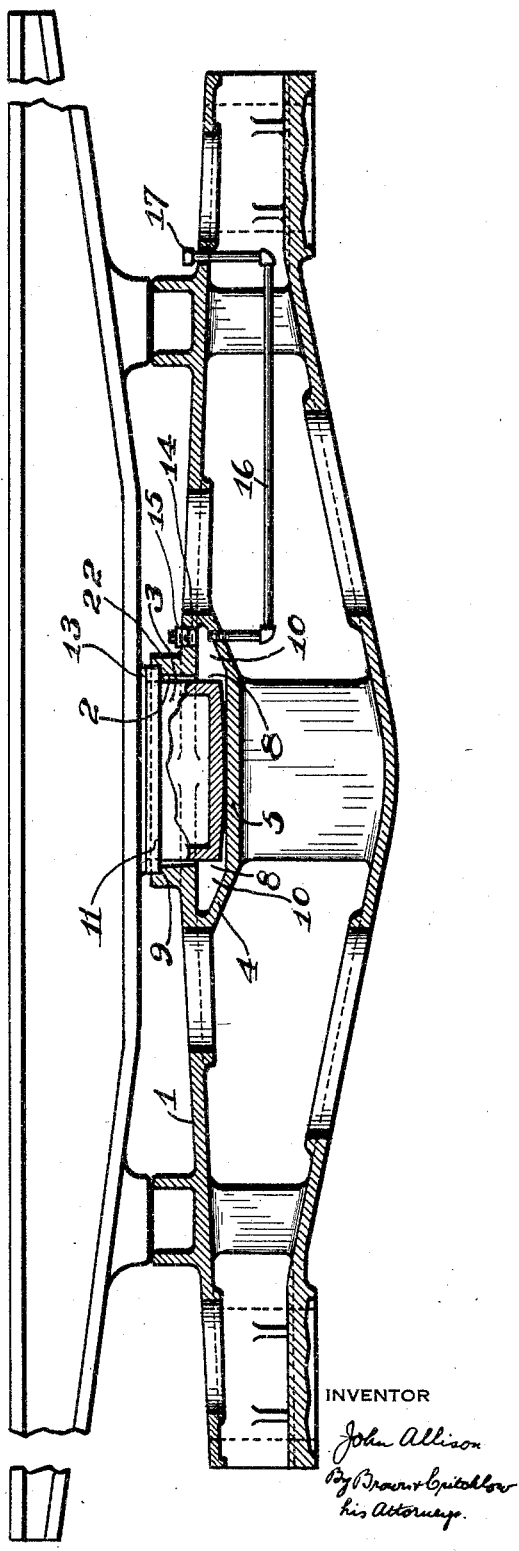
Figure 3:
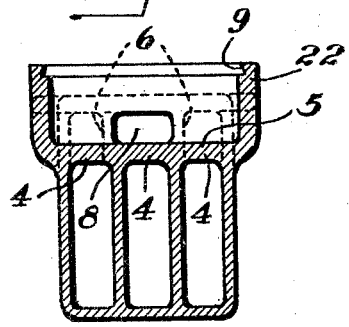
Figure 4:
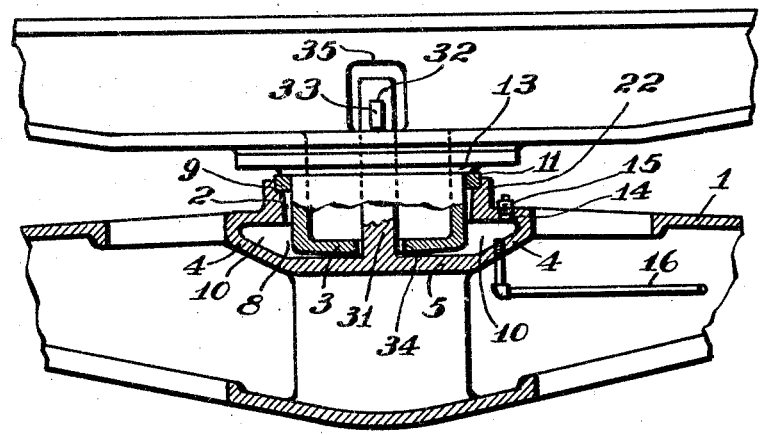

Other objects will become apparent and a better understanding of the invention will be had when the following detailed description is read in conjunction with the accompanying drawings, of which Fig. 1 is a plan view of a truck bolster embodying the preferred form of the invention; Fig. 2 a side elevation of the bolster shown in Fig. 1 in combination with its cooperating body bolster, parts of the two being cut away to illustrate the bearing members and the lubricating reservoirs; Fig. 3 a section taken on the line III—III of Fig. 1; Fig. 4 a view similar to Fig. 2 of a modification of the invention showing means for preventing the bearing members from becoming disengaged; and Fig. 5 a view similar to Fig. 2 of another modification of the invention showing other means for holding the bearing members together.

In practicing the invention a cylindrical depression is formed in the upper central part of a cast truck bolster as an integral part of the casting, the depression being for the reception of a male bearing member attached to and projecting downwardly from the bottom of a car body bolster. This male member fits loosely into the female member, and permits the truck bolster to be freely pivoted thereabout. Stiffening members or ribs are formed in the truck bolster running lengthwise thereof and passing under the cylindrical depression in the center of the bolster to reinforce the bolster.

Adequate means for lubricating the bearing is provided by walling the stiffening ribs together in such a way that an oil reservoir is formed between them, the reservoirs being provided with openings extending into the cylindrical depression or female member of the center bearing. In order to conveniently introduce lubricating oil into the reservoirs, a conduit is connected to the reservoir and carried out to the outer end of the bolster from which point oil may be introduced into the reservoir without disturbing the bearing.

Referring now to the drawings, a cast metal car bolster 1 is shown having a cylindrical depression 2 formed in its central portion to provide a female member of a center bearing. Loosely fitted into this member is a male bearing member 3 which may be attached to or formed integrally with the bottom of a car bolster 1. The bottom of male member 3 rests upon a floor 5 forming the bottom of the female member 2, and stiffening ribs 6 are cast lengthwise in the car bolster and extend to cylindrical depression 2. In order to provide a reservoir 10 for holding an adequate supply of lubricant for the bearing members, walls 4 are formed between the stiffening ribs. Openings 8 are provided in the inner ends of these reservoirs placing them in communication with depression 2 so that oil contained in the reservoirs will freely circulate about the bearing surfaces.

A groove 9 is provided around the upper periphery of cylindrical depression 2 for the reception of a flexible packing ring 11 formed out of felt or any other type of suitable packing material, and a shoulder 13 is provided upon male member 3 and arranged to bear upon ring 11 when the bearing members are assembled. Hence foreign matter is effectively prevented from getting into the bearing, and the oil contained in the bearing and reservoirs is prevented from escaping. Furthermore, as the bearing surfaces of the bearing members wear away, packing ring 11 is correspondingly compressed with the result that it always functions as explained. The male member of the bearing has its bottom and side walls closed to prevent lubricating oil from entering its interior from its exterior.

In order that the reservoirs may be filled with oil after the bearing is assembled, an opening 14 is provided in the car bolster immediately above and extending into the lubricating reservoir 10, in which opening a plug 15 may be fitted. To more conveniently introduce oil into the reservoir, a conduit 16 extends from the reservoir through the bolster to its outer end, where it is turned upwardly to provide at the top of the bolster an opening 17 for receiving oil, and by means of which the level of the oil in the reservoir can be readily observed.

Figure 5:
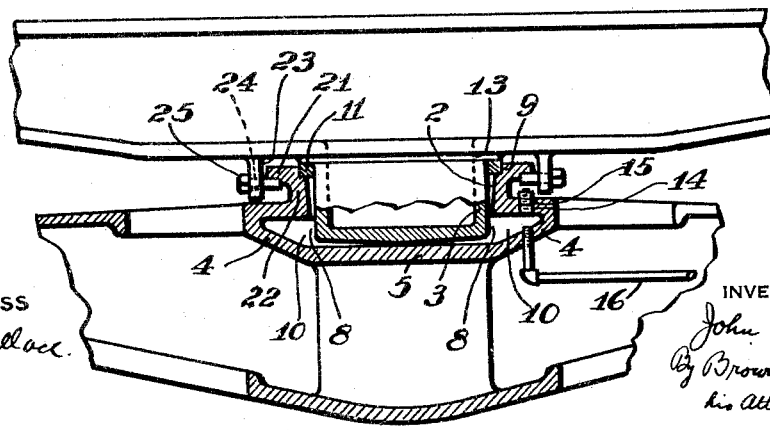

In structures of the type here contemplated it is sometimes desirable to provide means for effectively holding the cooperating bearing members together so that a car truck may not be readily disengaged from the car. For this purpose an annular flange 21, as shown in Fig. 5, may be formed on the upwardly projecting circular band 22 disposed around depression 2, and a downwardly projecting support 23 may be provided on the bottom of the car bolster. This projection is provided with an opening 24 in its lower end for receiving a locking bolt 25 which is adapted to slidably engage annular flange 21 and hold the two bearing members together. Another way to hold the bearing members together is shown in Fig. 4 wherein the female bearing member is provided with an upwardly projecting center post 31 having a keyway 32 in its upper end for reception of a key 33 which engages the car bolster. The bottom of the male member of the bearing in this case is provided with an opening 34 for receiving post 31, and an opening 35 may be made in the car bolster so that key 33 may be conveniently placed in key opening 32.

According to the provisions of the patent statutes, I have explained the principle and operation of my invention and have illustrated and described what I now consider to represent its best embodiment. However, I desire to have it understood that, within the scope of the appended claims the invention may be practiced otherwise than as specifically illustrated and described.

I claim:

1. A truck bolster having a cylindrical depression in its upper center portion forming the female member of a truck center bearing, and an oil reservoir formed in and integrally with the bolster outside of said depression but adjacent to it and opening thereinto for containing a liberal supply of oil for lubricating the center bearing.

2. A truck bolster having a cylindrical depression in its upper center portion forming the female member of a truck center bearing, stiffening ribs formed in said bolster running lengthwise thereof and extending laterally from the side of the depression, and a wall connecting said ribs and forming with them an oil reservoir opening into said female bearing member.

3. A truck bolster having a cylindrical depression in its upper center portion forming the female member of a truck center-bearing, stiffening ribs extending laterally from the side of said depression to the bottom of the bolster in a lengthwise fashion therein and integral therewith, a wall connecting said ribs and forming with them an oil reservoir opening into the cylindrical depression, and a conduit extending from said reservoir to the outer end of the bolster for introducing oil into the reservoir.

4. A car truck center bearing, comprising a truck bolster having a cylindrical depression in its upper center portion forming the female bearing member of the bearing, an oil reservoir integral with and disposed inside the bolster adjacent to and opening into said cylindrical depression, a body bolster having a male bearing member projecting downward therefrom, said male member having its bottom and side wall closed and adapted to fit loosely in said cylindrical depression, a flexible packing ring fitted in an annular groove disposed around the upper periphery of the cylindrical depression in the truck bolster, and a shoulder disposed around the upper end of the male member adapted to bear upon said ring and prevent foreign matter from entering and oil from escaping from said bearing.

5. A car truck center bearing comprising a truck bolster having a cylindrical depression in its upper center portion forming the female member of the center bearing, stiffening ribs formed lengthwise in said bolster, a wall connecting said ribs and forming with them an oil reservoir communicating with said central bearing depression, a body bolster having a male bearing member projecting downwardly therefrom and forming a piston fitting loosely in said cylindrical depression, an annular groove in the upper periphery of said female member, an annular shoulder on the upper end of said male member, and a flexible packing ring in said annular groove below and in contact with said annular shoulder to prevent foreign matter from entering and oil from escaping from the bearing.

6. A hollow truck bolster having a cylindrical depression in its upper center portion forming the female member of a truck center bearing, a plurality of stiffening ribs extending laterally from the side of the depression to the top of the bolster and formed integrally therewith, and a wall joining the bottoms of the stiffening ribs and forming with them and the top of the bolster a reservoir opening into the female bearing member depression.

7. A car truck center bearing comprising a truck bolster having a cylindrical depression in its upper center portion forming a female bearing member, an oil reservoir integral with and disposed inside of said bolster adjacent to and opening into said cylindrical depression, a center post formed integrally with the bottom of said depression and projecting upwardly therefrom, a body bolster having a downwardly projecting male bearing member fitting loosely into said female member, said male member having an opening in its lower end through which said center post projects and detachable means secured to said center post for preventing the two bolsters from being separated.

In testimony whereof, I sign my name.

JOHN ALLISON.